Jan. 28, 1930.  C. E. NORTON  1,744,793

TOOL FOR USE IN HIGH PRESSURE LUBRICATING SYSTEMS

Filed Jan. 31, 1929

INVENTOR

BY

ATTORNEYS

Patented Jan. 28, 1930

1,744,793

UNITED STATES PATENT OFFICE

CLARENCE E. NORTON, OF GUILFORD, CONNECTICUT

TOOL FOR USE IN HIGH-PRESSURE LUBRICATING SYSTEMS

Application filed January 31, 1929. Serial No. 336,411.

The object of my invention is to provide a tool which is well adapted for use in connection with high pressure lubricating systems, which tool will effect a material saving in time where a large number of parts are to be lubricated, as, for instance, those located in various positions in an automobile. A further object is to provide a tool which will automatically function to admit or to cut off the supply of lubricant as the tool is subjected to manual pressure or released therefrom.

My invention consists of a tool of the above character having a lubricant supply passage adapted to be connected to the lubricant pressure supply line of a force pump or other source of lubricant supply and to be connected with the part to be lubricated; said tool comprising relatively movable tool members, means being provided for yieldingly holding the tool members at the limit of their relative movement in one direction, said tool members being manually moved to the limit of their relative movement in the opposite direction and a valve being provided for opening and closing the lubricant supply passage, said valve being normally closed when the tool members are at the limit of their relative movement in one direction and positively opened when the tool members are manually moved relatively to each other in the opposite direction.

My invention more particularly comprises a tool of the above character having two relatively expansible and contractible telescoping members held yieldingly extended by a spring and in which the valve is carried by one member and means are carried by the other member arranged in position to engage and open the valve to permit the lubricant to be fed to the part to be lubricated when the members are manually contracted by endwise pressure.

Figure 1:
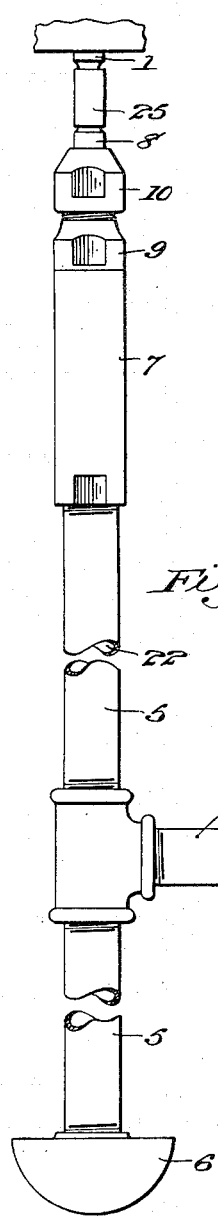
Figures 2, 3:
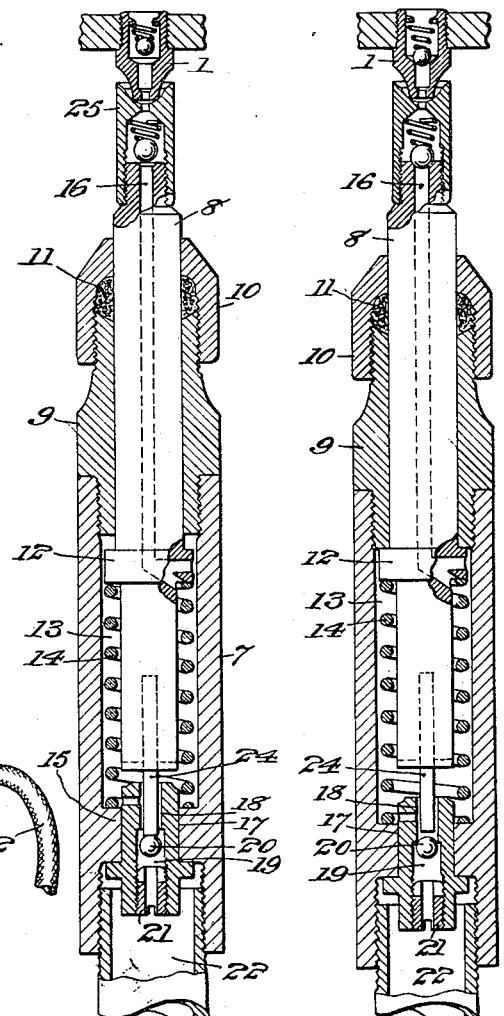

A practical embodiment of my invention is represented in the accompanying drawings, in which Fig. 1 represents in side elevation the tool connected to the lubricant supply line and with the part to be lubricated;

Fig. 2 represents on an enlarged scale, a detail longitudinal central section through the tool and the fitting for the part to be lubricated, the parts being shown in the positions they assume when the tool is manually contracted and the valve for the lubricant supply passage is held open to permit the passage of the lubricant to the part to be lubricated; and Fig. 3 represents a similar view with the parts in the positions they assume when the manual endwise pressure has been removed, the tool has been extended, and the lubricant supply passage closed by its valve.

The part to be oiled is herein shown as provided with a suitable fitting 1 of well known or approved form. The lubricant pressure supply line 2 leads from any lubricant pressure supply source, as, for instance, a force pump (not shown herein) and it is shown as removably connected by a suitable fitting 3 of well known or approved form to the outer end of a tubular handle 4 which projects laterally from the tubular shank 5 of my improved extensible and contractible tool, which shank is shown as provided with a suitable knob or handle 6 at its rear end for receiving, together with the handle 4, the endwise manual pressure on the tool to contract the same when it is desired to permit the lubricant to be fed through the tool to the part to be lubricated.

This tool is shown as comprising two relatively extensible and contractible telescoping members 7 and 8. The rear tubular tool member 7 includes the shank 5 secured to its rear end and the tubular guide 9 secured to its front end. The front tubular tool member 8 of the tool telescopes within the rear tubular member 7 and slidably fits the bore of the tubular guide 9. A packing nut 10 engages the front end of the tubular guide 9 and serves to hold the packing 11 with the desired degree of friction around the front tool member 8.

The front tool member 8 is provided with an annular external flange 12 within the bore 13 of the rear tool member 7 and this flange forms a stop to limit the extension of the members by its engagement with the rear end of the guide 9 and also forms a seat for the front end of an expansion coil spring 14, the rear end of which spring seats against an annular internal flange 15 of the rear tool member 7. This spring 14 serves as a means for yieldingly holding the tool members extended.

The bore 16 of the front tool member 8 leads from the front end of the member to the bore 13 of the rear tool member.

A valve unit 17 is fitted to the reduced bore formed by the annular internal flange 15 of the rear tool member, said valve unit having a reduced front bore 18 and an enlarged rear bore 19 forming at their juncture an annular seat for a freely movable ball valve 20 which is held normally on its seat by the pressure of the lubricant in back of the same. A hollow screw plug 21 engages the larger bore 19 of the valve unit for limiting the opening movement of the valve.

The bore 13 of the rear tool member, the bores 18 and 19 of the valve unit, the bore 22 of the shank 5 and the bore 23 of the lateral handle 4 of the tool, together form the lubricant supply passage through the tool.

A pin 24 projecting rearwardly from the rear end of the front tool member 8 into the smaller bore 18 of the valve unit serves as the means for engaging and lifting the valve 20 from its seat when the tool members are manually contracted against the tension of the spring 14.

A valved nozzle 25 of well known or approved construction is screwed on to the front end of the front tool member 8 and its outer end is shaped for engagement with the lubricating fitting 1 carried by the part to be lubricated.

The application of my tool to a high pressure lubricating system is as follows:—

The lateral handle 4 of the tool is connected by the fitting 3 to the line 2 leading to the source of pressure supply and the front tool member 8 is provided with the required nozzle 25. The tool is then placed against the fitting 1 for the part to be lubricated. Manual endwise pressure is then exerted on the tool sufficient to contract the tool members against the pressure of the spring 14 and thereby cause the pin 24, carried by the front tool member 8, to engage and positively open the valve 20, thus opening up the lubricant supply passage. When sufficient lubrication has been forced to the said part the manual endwise pressure on the tool is removed and the spring 14 allowed to extend the members and thereby permit the valve 20 to be closed by the lubricant pressure back of the same.

It will thus be seen that I have provided a very simple and efficient tool which is capable of being rapidly applied to the fittings for the parts to be lubricated.

It is evident that various changes may be resorted to in the construction, form and arrangement of the several parts without departing from the spirit and scope of my invention; hence, I do not wish to limit myself to the particular embodiment herein shown and described, but what I claim is:—

1. A tool for use in high pressure lubricating systems, said tool having a lubricant supply passage and comprising an outer member for attachment to the lubricant supply line and an inner member for engagement with the part to be lubricated, said inner member telescoping within the outer member, spring means yieldingly holding the members extended, a valve located in the outer member for opening and closing the said passage, said valve being normally closed, and a valve engaging pin carried by the inner member for positively opening the valve when the members are manually contracted.

2. A tool for use in high pressure lubricating systems, said tool having a lubricant supply passage and comprising an outer member for attachment to the lubricant supply line and an inner member for engagement with the part to be lubricated, said inner member telescoping within the outer member, spring means yieldingly holding the members extended, a valve located in the outer member for opening and closing the said passage, said valve being normally closed by lubricant pressure, and a valve engaging pin carried by the inner member for positively opening the valve when the members are manually contracted.

3. A tool for use in high pressure lubricating systems, said tool having a lubricant supply passage and comprising an outer tubular member provided with a tubular front guide, an inner tubular member slidable in said guide, annular exterior and interior flanges on the inner and outer members respectively, a coil expansion spring engaging said flanges for yieldingly holding the members extended, a tubular valve unit fitting the bore of the said annular interior flange and including a valve normally closing the supply passage when the members are extended, and a pin on the inner member arranged to engage and open the valve when the members are manually contracted.

4. A tool for use in high pressure lubricating systems, said tool having a lubricant supply passage and comprising an outer tubular member provided with a tubular front guide, an inner tubular member slidable in said guide, annular exterior and interior flanges on the inner and outer members respectively, a coil expansion spring engaging said flanges for yieldingly holding the members extended, a tubular valve unit fitting the bore of the said annular interior flange and including a valve normally closing the supply passage by lubricant pressure when the members are extended, and a pin on the inner member arranged to engage and open the valve when the members are manually contracted.

5. A tool for use in high pressure lubricating systems, said tool having a lubricant supply passage and comprising an outer member for attachment to the lubricant supply line and an inner member for engagement with the part to be lubricated, said inner member telescoping within the outer member, spring means yieldingly holding the members extended, a valve located in the outer member for opening and closing the said passage, said valve being normally closed, and means carried by the inner member for positively opening the valve when the members are manually contracted.

6. A tool for use in high pressure lubricating systems, said tool having a lubricant supply pasage and comprising an outer member for attachment to the lubricant supply line and an inner member for engagement with the part to be lubricated, said inner member telescoping within the outer member, spring means yieldingly holding the members extended, a valve located in the outer member for opening and closing the said passage, said valve being normally closed by lubricant pressure, and means carried by the inner member for positively opening the valve when the members are manually contracted.

7. A tool for use in high pressure lubricating systems, said tool having a lubricant supply passage and comprising an outer tubular member provided with a tubular front guide, an inner tubular member slidable in said guide, annular exterior and interior flanges on the inner and outer members respectively, a coil expansion spring engaging said flanges for yieldingly holding the members extended, a tubular valve unit fitting the bore of the said annular interior flange and including a valve normally closing the supply passage when the members are extended, and means on the inner member arranged to engage and open the valve when the members are manually contracted.

8. A tool for use in high pressure lubricating systems, said tool having a lubricant supply passage and comprising an outer tubular member provided with a tubular front guide, an inner tubular member slidable in said guide, annular exterior and interior flanges on the inner and outer members respectively, a coil expansion spring engaging said flanges for yieldingly holding the members extended, a tubular valve unit fitting the bore of the said annular interior flange and including a valve normally closing the supply passage by lubricant pressure when the members are extended, and means on the inner member arranged to engage and open the valve when the members are manually contracted.

9. A tool for connecting a high pressure lubricant supply line with a lubricant receiving fitting, comprising normally extended outer and inner telescoping members having a lubricant supply passage, a normally closed valve for said passage, means carried by the inner member for opening said valve when the members are contracted, means carried by the inner member for making a substantially lubricant tight connection with the lubricant receiving fitting by pressure only, and means carried by the outer member whereby pressure may be applied on the lubricant receiving fitting.

10. A tool for connecting a high pressure lubricant supply line with a lubricant receiving fitting, comprising normally extended outer and inner telescoping members having a lubricant supply passage, a normally closed valve for said passage, means carried by the inner member for opening said valve when the members are contracted, a valve nozzle carried by the inner member for making a substantially lubricant tight connection with the lubricant receiving fitting by pressure only, and means carried by the outer member whereby pressure may be applied to contract the members for opening the valve and to make a lubricant tight connection between the valve nozzle and the lubricant receiving fitting.

11. A tool for connecting a high pressure lubricant supply line with a lubricant receiving fitting, consisting of an outer hollow member and an inner telescoping member having a passage therethrough, a valve carried by the outer member for controlling the flow of lubricant to said passage in the inner member, means carried by the inner member for opening said valve when the members are contracted, means carried by the inner member for making a substantially lubricant tight connection with the lubricant receiving fitting by pressure only, and means carried by the outer member whereby pressure may be applied to said lubricant receiving fitting.

12. A tool for connecting a high pressure lubricant supply line with a lubricant receiving fitting, consisting of an outer hollow member and an inner telescoping member having a passage therethrough, a valve carried by the outer member for controlling the flow of lubricant to said passage in the inner member, means carried by the inner member for opening said valve when the members are contracted, a valve nozzle carried by the inner member for making a substantially lubricant tight connection with the lubricant receiving fitting by pressure only, and a handle carried by said outer member whereby pressure may be applied on said lubricant receiving fitting.

In testimony, that I claim the foregoing as my invention, I have signed my name this 25th day of January, 1929.

CLARENCE E. NORTON.